United States Patent [19]
Schaupp

[11] Patent Number: 4,502,955
[45] Date of Patent: Mar. 5, 1985

[54] FILTER ASSEMBLY

[75] Inventor: Richard E. Schaupp, Modesto, Calif.

[73] Assignee: Racor Industries, Inc., Modesto, Calif.

[21] Appl. No.: 484,904

[22] Filed: Apr. 14, 1983

[51] Int. Cl.$^3$ ............................................. B01D 35/18
[52] U.S. Cl. ................... 210/149; 210/181; 210/184; 210/232; 210/313; 210/416.4; 210/DIG. 5; 123/557
[58] Field of Search ............... 210/181, 183, 184, 185, 210/232, 238, 311, 313, 416.4, DIG. 5, 149; 123/557

[56] References Cited

U.S. PATENT DOCUMENTS

| | | | |
|---|---|---|---|
| 564,657 | 7/1896 | Stiebel | 210/184 |
| 2,073,847 | 3/1937 | Miller | 210/184 |
| 2,103,434 | 12/1937 | Pennebaker | 210/311 |
| 2,306,984 | 12/1982 | Tolman | 210/184 |
| 2,337,893 | 12/1943 | Hutterer | 210/181 |
| 2,446,126 | 7/1948 | Crake | 210/183 |
| 3,228,527 | 1/1966 | McPherson | 210/DIG. 5 |
| 3,312,351 | 4/1967 | Kasten | 210/DIG. 5 |
| 4,253,954 | 3/1981 | Midkiff | 210/DIG. 5 |
| 4,292,179 | 9/1981 | Stone | 210/DIG. 5 |
| 4,372,260 | 2/1983 | Baker | 210/184 |
| 4,421,090 | 12/1983 | Davis | 123/557 |

FOREIGN PATENT DOCUMENTS

| | | | |
|---|---|---|---|
| 796664 | 1/1935 | France | 210/184 |
| 2078536 | 1/1982 | United Kingdom | 210/DIG. 5 |

*Primary Examiner*—Ernest G. Therkorn
*Attorney, Agent, or Firm*—Kerkam, Stowell, Kondracki & Clarke

[57] ABSTRACT

A filter assembly characterized by an electric heater assembly having a heater coil disposed in an inlet flow path to filter media and carried within the filter media. The electric heater assembly also includes a thermostat with the inlet portion of the flow path for sensing fuel temperature immediately prior to passing into the filter media.

21 Claims, 5 Drawing Figures

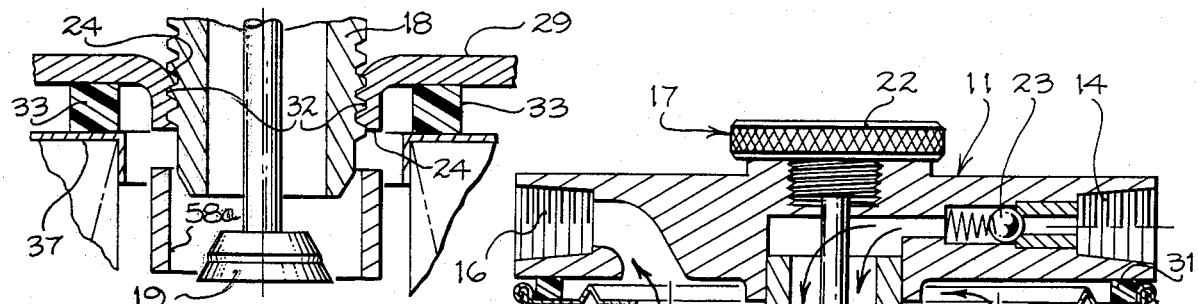
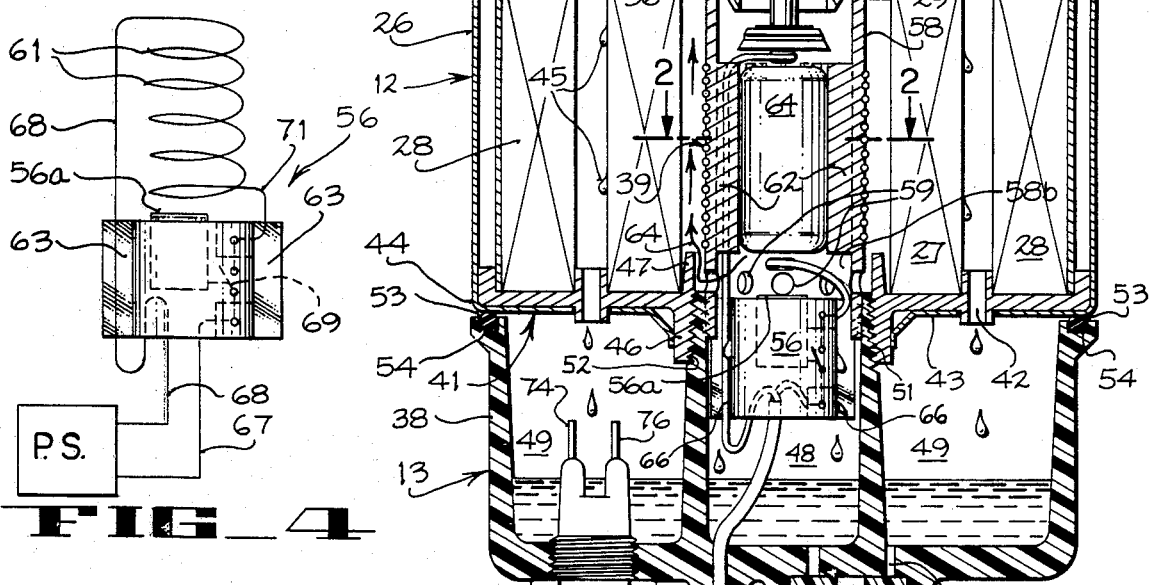
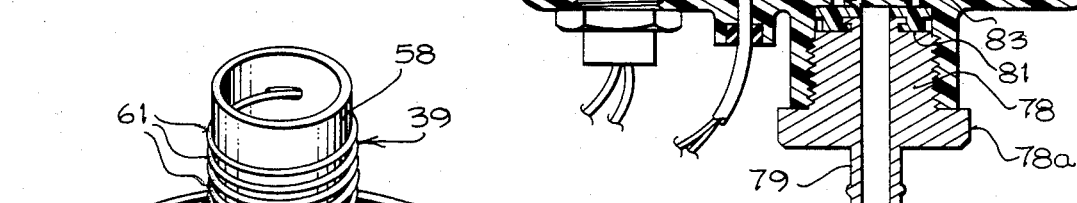
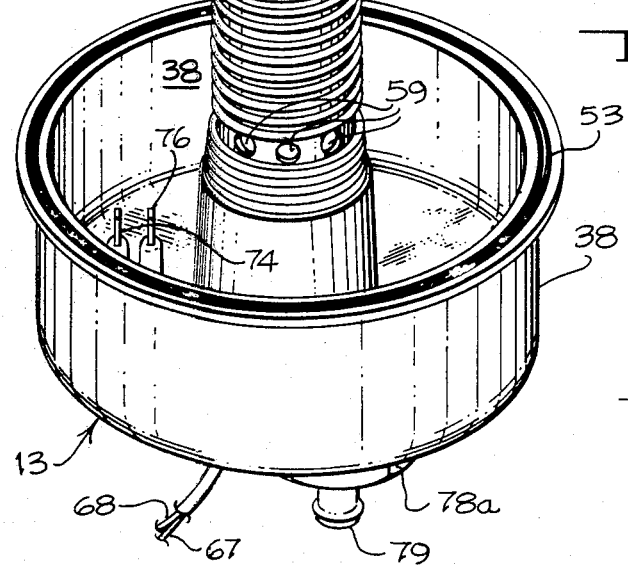
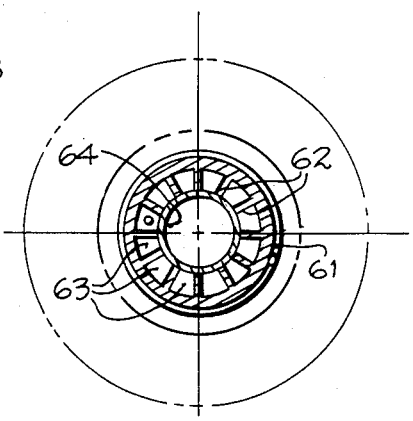

FILTER ASSEMBLY

This invention pertains to a filter assembly particularly useful in separating contaminants, such as water, from fuel being supplied to an engine.

In the fuel supply system of many diesel engines, diesel fuel is fed through a filter to separate water and other contaminants from the fuel. In addition, fuel pre-heaters have been employed upstream of the filter so as to improve performance of the engine. However, where fuel is required to pass through filters, extremely cold weather can cause blockage of the flow of fuel via the filter if heat from the pre-heaters is lost to the environment. Passing fuel along an exposed flow path to the filter can cause pre-heating to be ineffective while permitting the filter media to become blocked. Once the filter is blocked, the flow of fuel to the engine fails. Further, there is no way that heat from the fuel pre-heater can be applied to the filter to "unblock" it.

It has also been found that supplying the filter with a larger flow of fuel that can be heated causes the filter to become plugged with wax.

The filter assembly disclosed herein includes means for safeguarding against and for correcting the foregoing problems.

In general, for use with a fuel filter assembly of the type employing a filter media and having means defining a flow path for fuel to pass to and from the media, a filter bowl unit includes means for collecting contaminants from fuel passing along the flow path. The collecting means supports fuel heating means in a manner to dispose the fuel heating means within the media and flow path. The fuel heating means includes an electric heating coil and a tubular support carrying same coiled therearound.

One aspect of the invention includes the provision of a heater coil and means supporting it within the filter media in a manner substantially reducing heat loss prior to fuel entering the filter. In this way, the filter media becomes heated so that the fuel will be heated immediately before passing from the filter assembly.

Another aspect pertains to the provision of a contaminant collecting bowl carrying the heater coil disposed to be inserted into the open core of a filter cartridge. Additional aspects include provision of a thermostat disposed in the fuel flow path within the bowl unit to enhance its efficiency and the provision of a heating unit including an elongate tubular support adapted to be employed within a fuel filter. A length of heating wire wrapped along the support with the ends of the wire passing into the support to be coupled to a thermostat permits the thermostat and coil to be rotationally fixed with respect to each other.

It is an object of the present invention to provide an improved filter assembly.

Another object of the invention is to provide a filter assembly characterized by electric heating means adapted to be disposed within a filter media thereof.

An additional object of the invention is to provide a filter assembly characterized by a contaminant collecting bowl carrying a heater coil and thermostat and being readily coupled to a filter unit.

The foregoing and other objects of the invention will become more readily evident from the following detailed description of a preferred embodiment when considered in conjunction with the drawings.

FIG. 1 shows an elevation section view of a filter assembly according to the invention;

FIG. 2 shows a section view, in plan, of a detail taken along the line 2—2 of FIG. 1;

FIG. 3 shows a diagrammatic perspective view of a bowl unit according to the invention;

FIG. 4 shows a schematic circuit diagram for operating the heater coil; and

FIG. 5 shows an enlarged elevation section view of a detail of a portion of FIG. 1.

A filter assembly 10 comprises a mounting unit 11, a filter cartridge 12 coupled thereto and a bowl assembly 13 secured beneath filter cartridge 12.

Mounting unit 11 includes a rigid body including inlet and outlet flow passages 14, 16, respectively. A primer pump 17 includes a short downwardly directed rigid tube 18 suitably fastened into mounting unit 11 to form a continuation of inlet flow passage 14. A pliant plunger element 19 carried on the free end of a plunger rod 21 moves readily upwardly into tube 18. A knurled knob 22, threadedly held to the top of mounting unit 11, operates plunger element 19 between raised and lowered positions.

In operation, as element 19 moves upwardly, fuel readily passes across its pliant edge. A simple check valve 23 blocks the discharge of fuel back through inlet 14. However, during the downward stroke of element 19, fuel located ahead of it in tube 18 will be discharged and additional fuel drawn by suction through check valve 23. In this manner fuel can be primed or loaded into filter assembly 10 for an engine operating therefrom.

Means, such as threads 24, formed about the periphery of the lower end of tube 18 serve to mount a dual media filter cartridge 12. Filter cartridge 12 commonly called a spin-on filter unit, includes a container or filter casing 26 for holding a plurality of filter media such as the elongate annular coalescing filter media 27 disposed concentrically within an elongate annular filter 28.

Container 26 includes a top closure 29. The outer circumference of top closure 29 carries an annular mounting flange 31 formed with a downwardly depending cylindrical portion 31a which lies along side the upper edge margin of the cylindrical body of container 26. Portion 31a is a crimped over the end edge of container 26 to provide an appropriate seal.

Means for carrying filter cartridge 12 from mounting unit 11 includes a threaded opening 32 formed in top closure 29 and adapted to cooperate with threads 24 of tube 18.

Top closure 29 includes flow passages 36 for discharging filtered fuel therethrough.

Sealing means such as the inner annular seal 33 disposed beneath closure 29 and above an annular imperforate top plate 37 loosely carried upon the tops of coalescing media 27 and filter media 28.

Seal 33 prevents the flow of fuel from by-passing filter media 27, 28 to discharge directly via passages 26. An outer annular gasket seal 34 interposed between the underside of the body of mounting unit 11 and the top surface of cartridge 12 serves to prevent external leakage of filtered fuel.

As thus arranged the threaded opening 32 engages threads 24 of tube 18 whereby filter cartridge 12 can be simply threaded onto tube 18 and drawn upwardly against the underside of mounting unit 11 until a reliable seal is formed by means of the gasket 34 carried atop container 26.

A bottom closure 41 includes a plurality of drain ports 42 distributed therearound and at a radial displacement from the center of closure 41 to lie between coalescing media 27 and filter media 28. In this location, water droplets 45 coalesced and collected on the periphery of media 27 may drain downwardly into bowl 38 via ports 42.

Closure 41 further includes a downwardly directed internally threaded tubular portion 46 adapted to cooperate with and carry a bowl assembly 13 therefrom. Closure 41 further includes an upwardly extending fluid deflection flange 47 for purposes described further below.

Bowl assembly 13 includes, in general, an annular bowl 38 for collecting contaminants therein, such as water, separated from fuel passing through the unit, and a fuel heating unit 39 carried therefrom.

Bowl assembly 13 includes a central hollow contaminant collecting chamber or pre-filter 48 disposed upstream of media 27, 28. A second collecting chamber 49 surrounds pre-filter or chamber 48 to form a collection zone downstream of at least media 27. Threads 51 formed about the upper end of the elongate cylindrical wall of chamber 48 serve to engage the internal threads 52 within tubular portion 46 so as to support bowl 38 therefrom.

Means forming a seal with respect to filter cartridge 12 includes an O-ring 53 carried in an annular groove 54 formed in the upper edge of bowl 38.

Bowl assembly 13 supports fuel heating assembly 39 axially thereof to be disposed within the open core or central liquid receiving zone of filter cartridge 12. Thus, an elongate heat transfer body 58 of a material characterized by relatively high heat conductivity, such as aluminum, includes upper and lower cylindrical portions 58a, 58b. Lower cylindrical portion 58b protrudes to a limited extent into the interior of pre-filter 48 to be ultrasonically welded to the plastic material thereof. Accordingly, body 48 forms a continuation of the wall of the collection chamber 48 and extends sufficiently out of bowl 38 to be adapted to be disposed within a substantial portion of the length of filter cartridge 12 to form a flow path for receiving fuel from flow passage 14. In addition, heat transfer body 58 forms a tube having inlet and outlet flow passages for passing fuel to filter media 27, 28. The lower end 58b of body 58 includes a number of radially directed ports 59 for passing fuel out of body 58 and substantially immediately into media 27, 28.

The fuel heating asembly 39 is removably, threadably attached to filter unit by way of threads 51 and 52.

Means for heating fuel along the flow path and within media 27 includes an electric heating coil 61 wound in a spiral groove formed in and along the exterior of tubular support body 58. As shown, coil 61 is recessed in the tube 58.

In addition, a plurality of radially inwardly directed heat transfer fins 62 extend along the interior wall surface of support body 58 and serve to define a number of circumferentially spaced channels 63 or flow passages defined between adjacent pairs of fins 62. Fins 62, of course, are of a heat conductive material such as aluminum or the like. Further, means for directing incoming fuel to flow downwardly along the defined channels 63 to be be by energy transferred to the fins from the heater coil 61 has been provided as now to be described.

The flow directing means which serves to divert the flow of fuel into heating channels 63 includes a plug 64 disposed between and supported by the radially inner edges of fins 62. Plug 64 can be of a suitable material generally unaffected by contact with fuels or severe changes of temperature.

One particularly effective material for plug 64 would be aluminum of the type from which the body 58 has been formed.

A thermostat 56, staked into the bottom end of body 58 includes drain channels 63 for passing whole water droplets into chamber 48. Thus, the temperature sensing portion 56a of thermostat 56 lies in and defines a portion of the flow path disposed immediately upstream of filter media 27, 28, i.e. at a point substantially immediately prior to the fuel entering media 27, 28. In the event that the fuel needs to be heated, thermostat 56 serves (as described below) to operate coil 61 for transmitting heat to the heat transfer fins 62 through the side wall of body 58.

Deflection flange 47 serves to direct fuel upwardly along the paths 64 across heating coils 61 so as to become heated prior to entry into media 27, 28.

In addition to the above, as fuel moves downwardly into the region of the bottom cylindrical portion 58b whole water droplets are removed from the fuel stream and pass downwardly along flow passages 66 extending through thermostat 56 so that the droplets of water are collected within chamber 48.

As shown in FIG. 4, thermostat 56 receives power via leads 67, 68. Known heat responsive circuit control means represented by numeral 56a serves to operate thermostat 56 by opening and closing a circuit, such as controlled by a switch 69. When the fuel striking sensing portion 56a is sufficiently cold switch 69 closes thereby forming a complete circuit traced from lead 67 into the epoxy or other fuel impervious supporting block 72 to switch 69. The circuit proceeds further upwardly from switch 69 along lead 71 to coil 61 and from coil 61 downwardly via lead 68. Lead 68 enters supporting block 72 or housing from beneath with a distinct bend in order to avoid collection of water at the point of entry as might cause erosion.

It is to be noted that the upper cylindrical portion 58a of body 58 extends sufficiently upwardly to form a reasonably close fit while leaving a slight gap 25 with the beveled lower edge of tube 18 whereby virtually all fluid entering the filter assembly passes downwardly through the heating assembly.

Bowl assembly 13 includes means for detecting that depth of water collected within chamber 49 when fluid collecting chamber 49 should be drained. Thus, a sensor element 73 carries a pair of spaced probes 74, 76 whereby whenever the level of water rises to a point forming a connection between the two probes 74, 75 a circuit will be completed which operates, for example, a warning light on the dashboard of the vehicle employing a unit of the kind described.

Note that the bowl assembly 13 and mounting unit 11 may both be considered closure bodies in that they close off opposite ends or ports of the filter unit 12.

In draining the two concentric collection chambers 48, 49 a simple drain valve unit 77 includes a threaded plug 78 formed with a knurled knob 78a and with a central discharge channel 79. The upper end of plug 78 carries a resilient seal 81 for simultaneously closing off each of two drains 82, 83.

From the foregoing it will be readily evident that there has been provided an improved filter assembly characterized by a fuel heating unit adapted to be disposed within the fuel filter media to provide the maximum thermal efficiency.

I claim:

1. A fuel filter assembly comprising:
   (a) a filter cartridge having an annular filter media within a filter casing, and operative to filter fuel as it proceeds on a radially outward flow path through said filter media;
   (b) a mounting unit disposed above said filter cartridge and having said filter cartridge removably attached thereto, and including an inlet flow passage for passing fuel going into said filter cartridge to inside a central internal liquid receiving zone of said annular filter media and an outlet flow passage for passing fuel coming out of said fuel cartridge after radial passage through said annular filter media;
   (c) a filter bowl unit removably attached underneath said filter cartridge and operative to collect contaminants separated from fuel by said filter cartridge; and
   (d) an electric heating means disposed within said filter casing inside of said central internal liquid receiving zone of said annular filter media for heating fuel just before it proceeds radially outward through said filter media; and
   wherein said heating means is removably connected to said filter cartridge, and wherein said fiber bowl unit includes a contaminant collection chamber below said heating means, and wherein said heating means is mounted to said filter bowl unit and threadably attached to said filter cartridge by way of threads on said filter bowl unit mating with threads on said filter cartridge.

2. The fuel filter assembly of claim 1 further comprising an elongate tube attached to said filter bowl unit, disposed at least partially within said filter cartridge, and adapted for transferring heat from said heating means to fuel disposed within said filter cartridge, said tube including inlet and outlet passages for passing fuel via said tube to said filter media.

3. The fuel filter assembly of claim 2 wherein said heating means is an electric heating coil wound to said elongate tube.

4. The fuel filter assembly of claim 3 wherein said heating coil is recessed within a radially outer surface of said elongate tube.

5. The fuel filter assembly of claim 3 wherein said elongate tube includes a plurality of radially inwardly directed heat transfer fins extending along an interior wall surface of said elongate tube.

6. The fuel filter assembly of claim 2 further comprising a thermostat mounted to said elongate tube and disposed immediately upstream of said annular filter media, said thermostat operative to control said heating means.

7. The fuel filter assembly of claim 1 further comprising a thermostat disposed immediately upstream of said annular filter media, said thermostat operative to control said heating means.

8. The fuel filter assembly of claim 7 wherein said heating means is mounted to said filter bowl unit, said filter bowl unit having a central contaminant collection chamber and a separate annular outer contaminant collection chamber, said heating means threadably attached to said filter cartridge by way of threads on said filter bowl unit mating with threads on said filter cartridge, said threads on said filter bowl unit being disposed on a wall separating said central contaminant collection chamber from said annular outer contaminant collection chamber.

9. A filter bowl unit adapted to be removably attached underneath a filter cartridge which uses radially outward flow through an annular filter media to separate contaminants from fuel, said bowl unit comprising: a first contaminant collection chamber for collecting contaminants separated from fuel as the fuel passes through the filter cartridge, an electric heater means mounted to said bowl unit above said first contaminant collection chamber and operable to heat fuel disposed within a central internal liquid receiving zone of the annular filter media of the filter cartridge, and threads on said bowl unit for attaching said bowl unit to the filter cartridge such that said heater means is disposed within the central internal liquid receiving zone of the annular filter media, and wherein said heater means extends higher than said threads.

10. The filter bowl unit of claim 9 further comprising a thermostat mounted to said bowl unit such that said thermostat is disposed upstream of the annular filter media when said threads attach said bowl unit to the filter cartridge, said thermostat operative to control said heating means.

11. The filter bowl unit of claim 10 further comprising an elongate tube attached to said filter bowl unit disposed at least partially within said filter cartridge, and adapted for transferring heat from said heating means to fuel disposed within said filter cartridge, said tube including inlet and outlet passages for passing fuel via said tube to said filter media.

12. The filter bowl unit of claim 11 wherein said heating means is an electric heating coil wound to said elongate tube.

13. The filter bowl unit of claim 12 wherein said heating coil is recessed within a radially outer surface of said elongate tube.

14. The filter bowl unit of claim 12 wherein said elongate tube includes a plurality of radially inwardly directed heat transfer fins extending along an interior wall surface of said elongate tube.

15. The filter bowl unit of claim 9 further comprising a second contaminant collection chamber which is annular, and wherein said threads are disposed on a wall separating said first and second contaminant collection chambers.

16. A fuel heating assembly adapted to be removably threadably attached to a spin-on filter unit which uses radially outward flow through an annular filter media to separate contaminants from fuel such that contaminants drop into a collection bowl, said fuel heating unit comprising:
   (a) a closure body with threads for attaching the fuel heating assembly to the spin-on filter unit;
   (b) an electric heater means mounted to said body and projecting out from said body for heating fuel while disposed within a central internal liquid receiving zone of the annular filter media; and
   (c) a thermostat mounted to said body such that said thermostat is disposed upstream of the annular filter media when said threads attach said body to the filter unit, said thermostat operative to control said heating means, and further comprising an elongate tube attached to said body and adapted for transferring heat from said heating means to fuel disposed within the central internal liquid receiving zone of the annular filter media, said tube including inlet and outlet passages for passing fuel via said tube to the annular filter media.

17. The fuel heating assembly of claim 16 wherein said heating means is an electric heating coil wound to said elongate tube.

18. The fuel heating assembly of claim 17 wherein said heating coil is recessed within a radially outer surface of said elongate tube.

19. The fuel heating assembly of claim 17 wherein said elongate tube includes a plurality of radially inwardly directed heat transfer fins extending along an interior wall surface of said elongate tube.

20. The fuel heating assembly of claim 16 wherein said heating means projects out centrally from said body and said threads are disposed centrally and coaxial to said heating means.

21. The fuel heating assembly of claim 20 wherein said body is a bowl assembly including a central contaminant collection chamber and a separate annular outer collection chamber.

* * * * *